United States Patent
Sanbayashi et al.

(10) Patent No.: US 6,479,141 B1
(45) Date of Patent: Nov. 12, 2002

(54) PHOTOCATALYTIC COATING COMPOSITION AND PRODUCT HAVING PHOTOCATALYTIC THIN FILM

(75) Inventors: Masayuki Sanbayashi, Chiba (JP); Masahiro Ohmori, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/676,567

(22) Filed: Oct. 2, 2000

Related U.S. Application Data
(60) Provisional application No. 60/164,852, filed on Nov. 12, 1999.

(30) Foreign Application Priority Data

Sep. 30, 1999 (JP) ............................................. 11-278071

(51) Int. Cl.⁷ ......................... B32B 19/00; B32B 19/04; B01J 21/06; B01J 21/08
(52) U.S. Cl. ....................... 428/323; 428/327; 428/328; 428/329; 428/330; 428/331; 428/332; 428/333; 428/336; 502/208; 502/242; 502/150; 502/356; 502/351; 502/349; 502/343; 106/436; 106/438
(58) Field of Search ................................. 106/436–448; 502/242, 250, 349, 343, 527.12, 527.15, 350, 351, 208, 150; 428/220, 323, 327–329, 331, 332, 333, 336, 338; 423/598, 610

(56) References Cited

U.S. PATENT DOCUMENTS 6,165,256 A * 12/2000 Hayakawa et al. ........... 106/13
6,265,064 B1 * 7/2001 Mori .......................... 428/372

FOREIGN PATENT DOCUMENTS

| EP | 0 633 064 A1 | 1/1995 |
|---|---|---|
| JP | 07-232080 | 9/1995 |
| JP | 8-48940 | 2/1996 |
| JP | 08-164334 | 6/1996 |
| JP | 10-237353 | 9/1998 |
| WO | WO 98/03607 | 1/1998 |

OTHER PUBLICATIONS

Patent Abstracts of Japan, abstracting JP 8–48940 of Feb. 20, 1996.

* cited by examiner

Primary Examiner—Paul Thibodeau
Assistant Examiner—Nikolas J. Uhlir
(74) Attorney, Agent, or Firm—Sughrue Mion, PLLC

(57) ABSTRACT

A photocatalytic titanium dioxide coating composition is described, which comprises (a) finely-divided titanium dioxide particles exhibiting photocatalytic activity, (b) particles of an inorganic compound other than titanium dioxide, or particles of an organic compound convertible to particles of an inorganic compound on firing, (c) a binder, and (d) a solvent. The articles of an inorganic compound have an average particle diameter larger than that of the finely divided titanium dioxide particles and falls within the range of about 0.1 $\mu$m to about 1.0 $\mu$m. The inorganic compound particles are substantially insoluble in the solvent. The amount of the inorganic compound particles is in the range of about 0.5% to about 7% by weight based on the weight of the finely divided titanium dioxide particles. By coating a surface of a substrate with the coating composition, a coating film exhibiting excellent photocatalytic activity and no interference color is formed.

18 Claims, No Drawings

PHOTOCATALYTIC COATING COMPOSITION AND PRODUCT HAVING PHOTOCATALYTIC THIN FILM

CROSS-REFERENCE TO RELATED APPLICATION

This application is an application filed under 35 U.S.C. § 111(a) claiming benefit pursuant to 35 U.S.C. § 119(e)(1) of the filing date of Provisional Application 60/164,852 filed Nov. 12, 1999, pursuant to 35 U.S.C. § 111(b).

BACKGROUND OF THE INVENTION (1) Field of the Invention

This invention relates to a photocatalytic coating composition providing a thin film exhibiting excellent photocatalytic activity without giving interference color; and to a product having, on its surface, a thin film formed from the photocatalytic coating composition.

(2) Description of the Related Art

Recently, products having a titanium dioxide coating formed thereon exhibiting a photocatalytic activity have been used in a variety of fields in order to prevent staining by means of removing a harmful substance; to decompose pollutants such as ammonia and sulfur compounds in the air for removal, and to sterilize bacteria. When irradiated with light, photocatalytic titanium dioxide exhibits activity for a redox reaction in the irradiated area. Therefore, photocatalytic titanium dioxide is used in such a state that it is held on an exposed surface of a substrate. In order to maximize the effect of titanium dioxide held on a substrate, a coating of titanium dioxide is applied onto a surface of the substrate, so that the titanium dioxide forms a thin film. Examples of products on which titanium dioxide is held in such a manner include an illumination lamp, a mirror, and window glass used in deodorization and stain-proofing.

One method for forming titanium dioxide thin film is application of a coating composition containing titanium dioxide and a binder onto a surface of a substrate through a method such as spray-coating, dip-coating, flow-coating, spin-coating, roll-coating, or brush-coating, followed by drying and/or firing.

The thus-formed thin film formed through coating generally has an uneven thickness. In addition, difference in refractive index between the film and the substrate gives interference colors, resulting in undesirable appearance. Particularly in these days, environmental cleanliness of living space is a growing concern, and interior products having a titanium dioxide thin film thereon have been more widely used. Thus, there is still demand for mitigating the drawback in appearance.

Meanwhile, when a high-refractive-index hard coat is formed on a surface of a transparent substrate such as transparent plastic or glass, there has been proposed formation of a hard coat film by use of particles of composite oxide comprising titanium dioxide, silicon oxide, and zirconium oxide and/or aluminum oxide so as to prevent generation of interference bands given by difference in refractive index between a substrate and the hard coat film (Japanese Unexamined Patent Publication (Kokai) No. 48940/1996).

However, when titanium dioxide is used in the form of such composite oxide particles so as to provide a photocatalytic coating film, the photocatalytic activity of titanium dioxide is manifested insufficiently, which is disadvantageous.

In order to impart hydrophilicity and durability to a photocatalytic titanium dioxide film, there has been proposed a photocatalytic coating film which is made of a composite material containing titania and an amorphous metal oxide and incorporates finely divided particles of silica and/or alumina therein (Japanese Unexamined Patent Publication (Kokai) No. 68092/1998). This photocatalytic coating film is formed by applying onto a substrate a composite sol liquid containing titania sol capable of being dehydration-polycondensed, metal oxide sol capable of forming an amorphous metal oxide by dehydration-polycondensation, and a colloidal solution of silica and/or alumina, followed by firing. The coating film formed of a composite material of titania and an amorphous metal oxide and finely divided particles of silica and/or alumina effectively enhances hydrophilicity and durability, but, interference colors cannot be prevented.

SUMMARY OF THE INVENTION

In view of the aforementioned problems involved in the prior art, an object of the present invention is to provide a photocatalytic titanium dioxide coating composition which provides a thin film exhibiting excellent photocatalytic activity without giving interference color.

The present inventors have found that when a small amount of particles of an inorganic compound other than titanium dioxide (or particles of an organic compound convertible to particles of an inorganic compound during firing of a coating film), the particles having a relatively large particle diameter, is incorporated in a coating composition containing photocatalytic titanium dioxide, a thin film exhibiting excellent photocatalytic activity and no interference color is formed. The present invention have been completed on the basis of this finding.

Accordingly, in one aspect of the present invention, there is provided a photocatalytic titanium dioxide coating composition comprising (a) finely-divided titanium dioxide particles exhibiting photocatalytic activity, (b) particles of an inorganic compound other than titanium dioxide, or particles of an organic compound convertible to particles of an inorganic compound on firing, (c) a binder, and (d) a solvent, characterized in that the particles of an inorganic compound have an average particle diameter which is larger than that of the finely divided titanium dioxide particles and falls within the range of about 0.1 µm to about 1.0 µm; the inorganic compound particles are substantially insoluble in the solvent; and the amount of the inorganic compound particles is in the range of about 0.5% to about 7% by weight based on the weight of the finely divided titanium dioxide particles.

In another aspect of the present invention, there is provided a product having a photocatalytic titanium dioxide thin film formed on a surface of a substrate, which thin film is formed from a photocatalytic titanium dioxide coating composition comprising (a) finely-divided titanium dioxide particles exhibiting photocatalytic activity, (b) particles of an inorganic compound other than titanium dioxide, or particles of an organic compound convertible to particles of an inorganic compound on firing, (c) a binder, and (d) a solvent; said particles of an inorganic compound having an average particle diameter which is larger than that of the finely divided titanium dioxide particles and falls within the range of about 0.1 µm to about 1.0 µm; said inorganic compound particles being substantially insoluble in the solvent; and the amount of the inorganic compound particles being in the range of about 0.5% to about 7% by weight based on the weight of the finely divided titanium dioxide particles.

DETAILED DESCRIPTION OF THE PREFERRED EMBODIMENT

The photocatalytic titanium dioxide coating composition of the invention, and the product having a photocatalytic titanium dioxide thin film of the invention will be described in detail.

The finely divided titanium dioxide particles exhibiting photocatalytic activity, used in the invention, exhibit photocatalytic activity predominantly for a redox reaction of an organic compound, when irradiated with light having energy greater than a band gap between a conduction band and a valence band of a titanium dioxide crystal. No particular limitation is imposed on the finely divided titanium dioxide particles used in the invention, and crystalline particles are preferred. Although the crystal structure may be of anatase type, rutile type, or brookite type, brookite type is particularly preferred.

However, since finely divided titanium dioxide particles exhibiting excellent photocatalytic activity are preferred, the finely divided titanium dioxide particles preferably have a small particle diameter. Fine titanium dioxide particles having an average particle diameter less than about 0.004 $\mu$m are difficult to produce, and typically, the finely divided particles used have an average particle diameter of about 0.004 $\mu$m to about 0.1 $\mu$m, preferably about 0.005 $\mu$m to about 0.1 $\mu$m and more preferably about 0.006 $\mu$m to about 0.09 $\mu$m. The finely divided titanium dioxide particles have a specific surface area of preferably at least about 20 $m^2/g$, more preferably about 20 $m^2/g$ to about 300 $m^2/g$.

In order to prepare the coating composition of the invention, commercially available titanium dioxide powder may be used, but, titanium dioxide sol obtained by a titanium dioxide synthesis process as described below is preferably used.

Examples of the methods for synthesizing titanium dioxide include neutralization and hydrolysis of titanyl sulfate or titanium tetrachloride, and hydrolysis of a titanium alkoxide compound. Of these, a method using titanyl sulfate or titanium tetrachloride as a raw material is preferred, in view of high activity of the produced titanium dioxide and low production cost. Although a method involving hydrolysis of titanium alkoxide compound is advantageous in that a sol of considerably fine titanium dioxide powder having an excellent powder characteristic can be obtained, the production cost is higher than that of a method using titanyl sulfate or titanium tetrachloride as a raw material.

The aqueous sol obtained through hydrolysis is dried to thereby provide finely divided titanium dioxide powder, and the titanium dioxide powder is re-dispersed in water or a water/organic solvent mixture to thereby provide a coating liquid for forming a titanium dioxide thin film. However, this method is not advantageous. This is because titanium dioxide, a hydrolysis product, exhibits high surface activity, and the finer the titanium dioxide particles, the stronger the surface activity. Therefore, the particles are easily flocculated, and re-dispersion in water or the like medium is very difficult. Thus, a thin film formed from the dispersion exhibits poor transparency and reduced photocatalytic activity, and tends to be weakly held on a substrate. Therefore, an aqueous sol obtained by hydrolysis is preferably dechlorinated and dehydrated or diluted according to the need, and, thereafter, is used for preparing a coating composition.

The present inventors have already filed a patent application in connection with a preferred titanium dioxide sol (Japanese Patent Application No. 132195/1998). This sol contains a chloride ion, a nitrate ion, and/or a phosphate ion. Particularly, the sol contains a nitrate ion and/or a phosphate ion in an amount of about 0.1 mol to about 200 mol per mol of a chloride ion. The total amount of these ions is in the range of about 50 ppm to about 10,000 ppm. The sol contains brookite-type titanium dioxide which serves as a predominant component and has an average particle diameter of about 0.01 $\mu$m to about 0.1 $\mu$m and a specific surface area of at least about 20 $m^2/g$. By use of the sol, a titanium dioxide thin film exhibiting excellent transparency and peel strength can be formed on a substrate.

The coating composition preferably contains finely divided titanium dioxide particles in an amount of about 1% to about 25% by weight based on the total amount of the composition. When the amount is smaller than about 1% by weight, photocatalytic activity is insufficient. In contrast, when the amount is in excess of about 25% by weight, dispersibility of finely divided titanium dioxide particles is comparatively low, to thereby enhance the viscosity of the composition and render the composition unstable.

The particles of an inorganic compound other than titanium dioxide incorporated in the photocatalytic coating composition of the invention have a comparatively large average particle diameter so as not to give interference color in the produced thin film. More specifically, the particles of an inorganic compound incorporated in the composition have an average particle diameter larger than that of titanium dioxide particles and falls within the range of about 0.1 $\mu$m to about 1.0 $\mu$m. When the average particle diameter of the particles of an inorganic compound is too small, elimination of interference color is not sufficiently attained. When a large amount of inorganic compound particles of small size are incorporated, interference color is eliminated to some extent, but photocatalytic activity of titanium dioxide is deteriorated. In contrast, when inorganic compound particles of excessively large particle size are incorporated, hardness and transparency of the formed thin film are greatly deteriorated.

The composition contains the aforementioned inorganic particles in an amount of about 0.5% to about 7% by weight, preferably about 0.5% to about 5% by weight, based on the amount of finely divided titanium dioxide particles. When the amount of inorganic compound particles is too small, effect of eliminating interference colors is insufficiently attained, whereas when the content of inorganic compound particles is too large, the thin film becomes opaque, and the transparency of the film is lowered.

No particular limitation is imposed on the species of inorganic compound particles so long as the particle diameter falls within the above-described range and the particles are insoluble in the solvent contained in the composition. Any inorganic compound particles may be used, regardless of the photocatalytic ability thereof. Examples of usable inorganic compounds include oxides, carbonates, sulfides, iodides, bromides, sulfates, peroxides, hydroxides, perchlorates, carbides, nitrides and borides. Of these, an oxide or a hydroxide of aluminum, silicon, zinc and zirconium are preferred, with the oxides being more preferred, and aluminum oxide and zirconium oxide being particularly preferred.

The process for producing particles of an inorganic compound is not particularly limited; the particles may be produced through a conventionally known method, and high-dispersible finely divided particles produced through vapor phase growth are suitably used.

When a photocatalytic thin film is formed from the composition, particles of an organic compound may be used instead of the aforementioned particles of an inorganic compound particle, so long as the particles of an organic compound are convertible to particles of an inorganic compound under firing conditions employed in a firing step of the applied composition. Examples of such organic compounds include organic acid salts such as acetates, citrates and oxalates. The average particle diameter of organic compound particles and the amount of organic compound particles contained in the composition are adjusted such that the average particle diameter of the inorganic compound particles produced through firing and the amount as reduced to the produced inorganic compound particles satisfy the aforementioned conditions. The firing temperature required for converting particles of an organic compound to particles of an inorganic compound varies depending on the species of organic compound particles. For example, the aforementioned organic acid salts are generally fired at about 250° C. or higher, preferably at about 300° C.

The aforementioned inorganic compounds and organic compounds may be used singly or in combination of two or more species.

A binder is used to enhance cohesion between finely divided titanium dioxide particles and inorganic compound particles, and to form a thin film of high strength and hardness. At least one compound containing phosphorus or zirconium is preferably used as a binder. Examples of zirconium-containing compounds include water-soluble zirconium compounds such as zirconium oxychloride, zirconium hydroxychloride, zirconium nitrate, zirconium sulfate, zirconium acetate, and ammonium zirconium carbonate; and organic solvent-soluble zirconium compounds such as zirconium propionate. Furthermore, there may also be used complexes of a zirconium compound having at least one group selected from a hydroxy group, a carbonate group, or an alkylcarboxyly group; or polymers thereof. Examples of phosphorus-containing compounds include phosphoric acid, polyphosphoric acid and aluminum phosphate.

The zirconium compound serving as a binder may be incorporated in an amount of about 3% to about 30% by weight, preferably about 5% to about 20% by weight, as reduced to zirconia ($ZrO_2$), based on the finely divided titanium dioxide particles. The phosphorus-containing compound serving as a binder may be incorporated in an amount of about 1% to about 30% by weight, as reduced to $PO_4$, based on the finely divided titanium dioxide particles. When the amount of the binder is too small, the strength and hardness of the produced thin film are disadvantageously low. In contrast, when the amount of the binder is excessive, the photocatalytic activity is poor.

The solvent used for preparing the coating composition of the invention is required to dissolve a binder without dissolving the finely divided titanium dioxide particles and the aforementioned inorganic compound particles. The solvent is selected from among water and organic solvents, the organic solvents preferably being hydrophilic. As examples of the hydrophilic organic solvents, there can be mentioned monohydric alcohols such as methanol, ethanol, propanol and butanol; polyhydric alcohols such as ethylene glycol, diethylene glycol and glycerin; ketones such as acetone and methyl ethyl ketone; esters such as ethyl acetate and butyl acetate; and cellosolves such as ethyl sollosolve and ethyl cellosolve. The solvent may be used singly or in combination of two or more species. The solvent is preferably selected in consideration of stability of the composition, species of the substrate, drying conditions for the film-formation, production cost and other factors.

The amount of the solvent in the composition is not particularly limited, and, when the composition is coated on a substrate, the composition preferably has a viscosity suitable for coating operation.

Other than the aforementioned components, an arbitrary component may be incorporated in the coating composition of the invention. For example, in order to improve a film-forming property during application of the composition, the coating composition may contain a surfactant. The surfactant is preferably added in an amount of about 0.001% to 0.1% by weight based on the total amount of the composition. Examples of the surfactants include anionic surfactants such as sodium lauryl sulfate, sodium dodecylbenzenesulfonate, sodium alkylnaphthalenesulfonate, sodium dialkylsulfosuccinate, sodium polyoxyethylene lauryl ether sulfate and polycarboxylic acids; and nonionic surfactants such as polyoxyethylene lauryl ether and polyoxyethylene octyl phenyl ether.

The coating composition of the invention is applicable to a surface of any of a variety of materials, to thereby form a thin film. For example, the composition is applicable to glass, plastics, ceramics, and metal, and is particularly applicable to glass for which high transparency is required.

The coating composition of the invention is applied onto a surface of a substrate by any known method to thereby form a thin film. The coating methods include, for example, spray-coating, dip-coating, flow-coating, spin-coating, roll-coating, brush-coating and sponge-coating. The amount of applied composition is preferably in the range of about 0.05 µm to about 0.8 µm, in terms of the thickness of an as-formed liquid film. When the thickness is smaller than about 0.05 µm, photocatalytic activity is disadvantageously poor for practical use. In contrast, when the thickness is in excess of about 0.8 µm, the film becomes opaque.

After application of the composition, the coating film may be dried at room temperature. However, when the film is required to exhibit enhanced strength, the film is preferably hardened with heat at a temperature of about 80° C. to about 500° C. for a period of approximately 10 to 30 minutes.

The present invention will now be described in detail by way of examples, which should not be construed as limiting the invention thereto. In Examples, the symbol "%" represents percent by weight.

The average particle diameter of titanium dioxide particles and inorganic compound particles, interference color of a thin film, film hardness, and photocatalytic activity were measured or evaluated according to the following methods.

(1) Average Particle Diameter

The average particle diameter of finely divided titanium dioxide particles and inorganic compound particles were measured by a light-scattering particle size distribution measuring apparatus ("ELS-8000" supplied by Otsuka Electronics Co.).

(2) Interference Color

The interference color was evaluated by means of placing a thin film sample against a black background, reflecting fluorescent light on the surface of the thin film, and observing with the naked eye occurrence of a rainbow pattern induced by light interference. The evaluation results were expressed by the following three ratings A, B and C.

A: no rainbow pattern observed

B: faint rainbow pattern observed

C: clearly discernable rainbow pattern observed (3) Photocatalytic Activity

The photocatalytic activity was evaluated by means of applying a few drops of red ink on a thin film sample, irradiating the sample with a black light with wavelength of 365 nm for 15 minutes at an ultraviolet ray strength of 1.0 mW/cm², and observing fading of the red ink by the naked eye. The evaluation results were expressed by the following four ratings A, B, C and C.

A: red ink disappears
B: red ink fades substantially
C: red ink fades slightly
D: Fading of red ink is not observed.

(4) Film Hardness

The film hardness was evaluated by a pencil scratch test conducted in accordance with JIS K-5400.

Preparation of Finely Divided Titanium Dioxide Particles

Water was added to titanium tetrachloride (99.9% purity) to thereby prepare an aqueous solution of titanium tetrachloride having a concentration of 0.25 mol/l (2% as reduced to titanium dioxide). During preparation, a water-cooled system was used so as to prevent the temperature of the aqueous solution from elevating over 50° C. Then, the aqueous solution (1 liter) was placed in a reactor equipped with a reflux condenser, heated to a temperature near the boiling point (104° C.), and maintained at the temperature for 60 minutes for undergoing hydrolysis, to thereby prepare a water-dispersed titanium dioxide sol. After the sol was condensed by decantation, a water-dispersed titanium dioxide sol (A) having a titanium dioxide concentration of 20% and a pH of 2, and water-dispersed titanium dioxide sol (B) having a titanium dioxide concentration of 11% and a pH of 5.5 were obtained by an electrodialyzer G3 (supplied by Asahi Chemical Industry Co.). A portion of each sample was subjected to particle diameter measurement, and the average particle diameters were 0.02 μm and 0.05 μm, and specific surface areas were 122 m²/g and 80 m²/g, respectively.

EXAMPLE 1

To an aqueous solution (A) (25 g) (titanium dioxide concentration of 20%) of titanium dioxide sol, which titanium dioxide had an average particle diameter of 0.02 μm, were added an aqueous zirconium hydroxychloride solution with a concentration of 20% as reduced to zirconia (1.25 g) and pure water (73.75 g). Aluminum oxide particles having an average secondary particle diameter of 0.2 μm (Alumina Oxide C, supplied by Nippon Aerosil Co.) (0.05 g) were added thereto. The mixture was dispersed thoroughly by an ultrasonic bath, to thereby prepare a coating composition.

The average secondary particle diameter of aluminum oxide particles was measured after the particles had been dispersed in pure water in advance.

The coating composition (2 ml) was applied onto a 76×26 mm soda lime glass plate, and a residual composition was removed by allowing the coated glass to stand vertically for ten minutes, to thereby complete coating. The coated glass plate was dried with heat in a dryer set at 150° C., to thereby obtain a thin film sample.

The characteristics of the thin film sample were evaluated. The results are shown in Table 1.

EXAMPLE 2

A coating film was prepared in a manner similar to that employed in Example 1, except that the amount of added aluminum oxide particles was changed to 0.25 g during preparation of the composition of Example 1, and the film was then subjected to evaluation. The results are shown in Table 1.

EXAMPLE 3

A coating film was prepared in a manner similar to that employed in Example 1, except that the amount of added zirconium hydroxychloride solution with a concentration of 20% as reduced to zirconia was changed to 5 g during preparation of the composition of Example 1, and the film was then subjected to evaluation. The results are shown in Table 1.

EXAMPLE 4

A coating film was prepared in a manner similar to that employed in Example 1, except that the amount of added zirconium hydroxychloride solution with a concentration of 20% as reduced to zirconia was changed to 5 g during preparation of the composition of Example 2, and the film was then subjected to evaluation. The results are shown in Table 1.

EXAMPLE 5

Aqueous ammonia was added to an aqueous solution (A) of titanium dioxide sol (average particle size: 0.02 μm), to thereby obtain an aqueous sol having a pH of 9. To the titanium dioxide sol (25 g) (titanium dioxide concentration of 20%) were added an aqueous ammonium zirconium carbonate solution with a concentration of 20% as reduced to zirconia (1.25 g) and pure water (73.75 g). Aluminum oxide particles having an average secondary particle diameter of 0.2 μm (0.05 g) were added thereto. The mixture was dispersed thoroughly by an ultrasonic bath, to thereby prepare a coating composition.

A coating film was prepared in a manner similar to that employed in Example 1. The evaluation results are shown in Table 1.

COMPARATIVE EXAMPLE 1

To an aqueous solution (A) (25 g) (titanium dioxide concentration of 20%) of titanium dioxide sol, which titanium dioxide had an average particle diameter of 0.02 μm, were added an aqueous zirconium hydroxychloride solution with a concentration of 20% as reduced to zirconia (1.25 g) and pure water (73.3 g). Aluminum oxide particles having an average secondary particle diameter of 0.05 μm (the aforementioned water-dispersed titanium dioxide sol (B), concentration of 11%) (0.45 g) were added thereto. The mixture was dispersed thoroughly by an ultrasonic bath, to thereby prepare a coating composition.

A coating film was prepared in a manner similar to that employed in Example 1. The evaluation results are shown in Table 1.

TABLE 1

|  | Interference color | Photocatalytic activity | Pencil hardness |
| --- | --- | --- | --- |
| Example 1 | A | A | 4H |
| Example 2 | A | A | 4H |
| Example 3 | A | B | 6H |
| Example 4 | A | C | 6H |
| Example 5 | A | A | 4H |
| Comp. Ex. 1 | C | B | 4H |

The thin film formed from the coating composition of the invention is characterized as exhibiting excellent photocatalytic activity and giving no interference color. Also, a thin film of enhanced hardness can be obtained by selecting an inorganic compound for blending.

Thus, the coating composition of the invention is a material useful for forming a transparent thin film giving no interference color and exhibiting photocatalytic activity, on a substrate such as any of a variety of types of window glass, front glass for an automobile, a fluorescent light, eyeglasses, and a display face.

What is claimed is:

1. A photocatalytic titanium dioxide coating composition comprising (a) finely-divided titanium dioxide particles exhibiting photocatalytic activity, (b) particles of an inorganic compound other than titanium dioxide, or particles of an organic compound convertible to particles of an inorganic compound on firing, (c) a binder, and (d) a solvent, characterized in that the particles of an inorganic compound have an average particle diameter which is larger than that of the finely divided titanium dioxide particles and falls within the range of about 0.2 $\mu$m to about 1.0 $\mu$m; the inorganic compound particles are substantially insoluble in the solvent; and the amount of the inorganic compound particles is in the range of about 0.5% to 7% by weight based on the weight of the finely divided titanium dioxide particles.

2. The composition according to claim 1, wherein the finely divided titanium dioxide particles have an average particle diameter of about 0.004 $\mu$m to about 0.1 $\mu$m.

3. The composition according to claim 1, wherein the particles of the inorganic compound are particles of at least one compound selected from the group consisting of aluminum oxide, silicon oxide, zinc oxide and zirconium oxide.

4. The composition according to claim 1, wherein the particles of the organic compound are particles of a salt of an organic carboxylic acid and are convertible to particles of an inorganic compound on firing at a temperature of 250° C. or higher.

5. The composition according to claim 1, wherein the binder is a zirconium-containing compound or a phosphorus-containing compound.

6. The composition according to claim 1, wherein the binder is a water-soluble or organic solvent-soluble zirconium-containing compound, and its amount is in the range of about 3% to about 30% by weight as reduced to zirconia ($ZrO_2$) based on the weight of the finely divided titanium oxide particles.

7. The composition according to claim 1, wherein the binder is a phosphorus-containing compound, and its amount is in the range of about 1% to about 30% by weight as reduced to $PO_4$, based on the weight of the finely divided titanium oxide particles.

8. The composition according to claim 1, wherein the solvent is selected from the group consisting of water and hydrophilic organic solvents.

9. The composition according to claim 1, which further comprises about 0.001% to about 0.1% by weight, based on the weight of the composition, of a surface active agent.

10. A product having a photocatalytic titanium dioxide thin film formed on a surface of a substrate, which then film is formed from a photocatalytic titanium dioxide coating composition comprising (a) finely-divided titanium dioxide particles exhibiting photocatalytic activity, (b) particles of an inorganic compound other than titanium dioxide, or particles of an organic compound convertible to particles of an inorganic compound on firing, (c) a binder, and (d) a solvent;

said particles of an inorganic compound having an average particle diameter which is larger than that of the finely divided titanium dioxide particles and falls within the range of about 0.2 $\mu$m to about 1.0 $\mu$m; said inorganic compound particles being substantially insoluble in the solvent; and the amount of the inorganic compound particles is in the range of about 0.5% to 7% by weight based on the weight of the finely divided titanium dioxide particles.

11. The product according to claim 10, wherein the finely divided titanium-dioxide particles have an average particle diameter of about 0.004 $\mu$m to about 0.1 $\mu$m.

12. The product according to claim 1, wherein the particles of the inorganic compound are particles of at least one compound selected from the group consisting of aluminum oxide, silicon oxide, zinc oxide and zirconium oxide.

13. The composition according to claim 1, wherein the particles of the inorganic compound are particles of at least one compound selected from the group consisting of aluminum oxide, zinc oxide and zirconium oxide.

14. The composition according to claim 1, wherein the binder is a zirconium-containing compound selected from the group consisting of zirconium oxychloride, zirconium hydroxychloride, zirconium nitrate, zirconium sulfate, and ammonium zirconium carbonate, or a phosphorous-containing compound selected from the group consisting of phosphoric acid, polyphosphoric acid and aluminum phosphate.

15. The composition according to claim 1, wherein the binder is zirconium hydroxychloride.

16. The composition according to claim 1, wherein the binder is a water-soluble or organic solvent-soluble zirconium-containing compound selected from the group consisting of zirconium oxychloride, zirconium hydroxychloride, zirconium nitrate, zirconium sulfate, and ammonium zirconium carbonate, and its amount is in the range of about 3% to about 30% by weight as reduced to zirconia ($ZrO_2$) based on the weight of the finely divided titanium oxide particles.

17. The composition according to claim 16, wherein the binder is zirconium hydroxychloride.

18. The composition according to claim 1, wherein the binder is a phosphorous-containing compound, and its amount is in the range of about 1% to about 30% by weight as reduced to $PO_4$, based on the weight of the finely divided titanium oxide particles.

* * * * *